Dec. 20, 1955 D. W. HAMBLIN 2,727,291
AIRCRAFT CATAPULT HOLDBACK AND RELEASE UNIT
Filed April 28, 1953 2 Sheets-Sheet 1
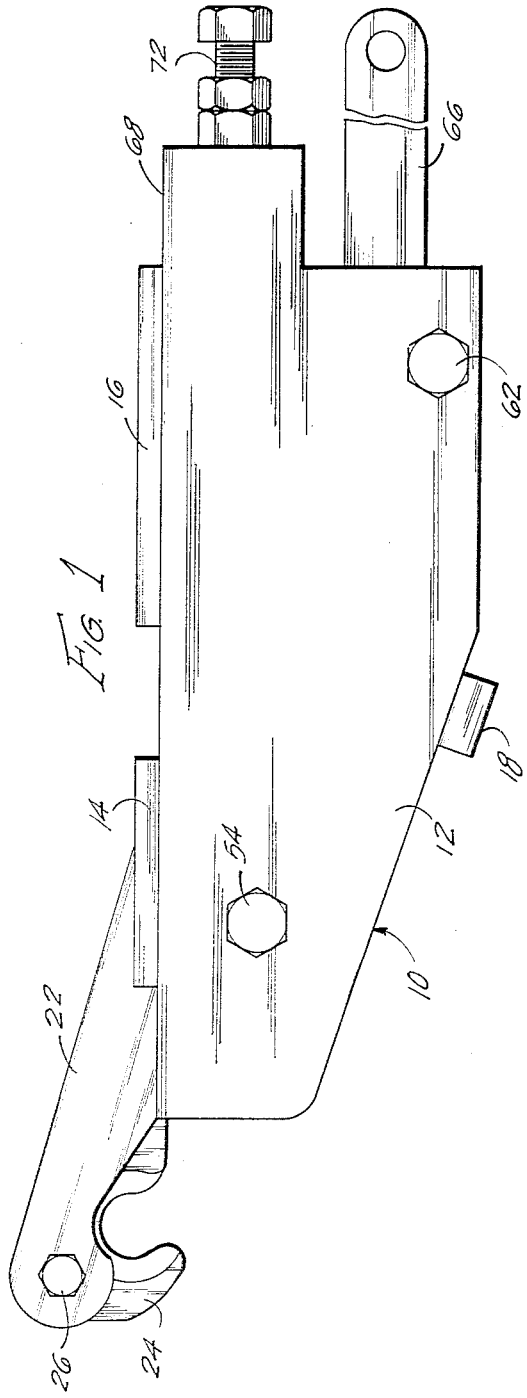
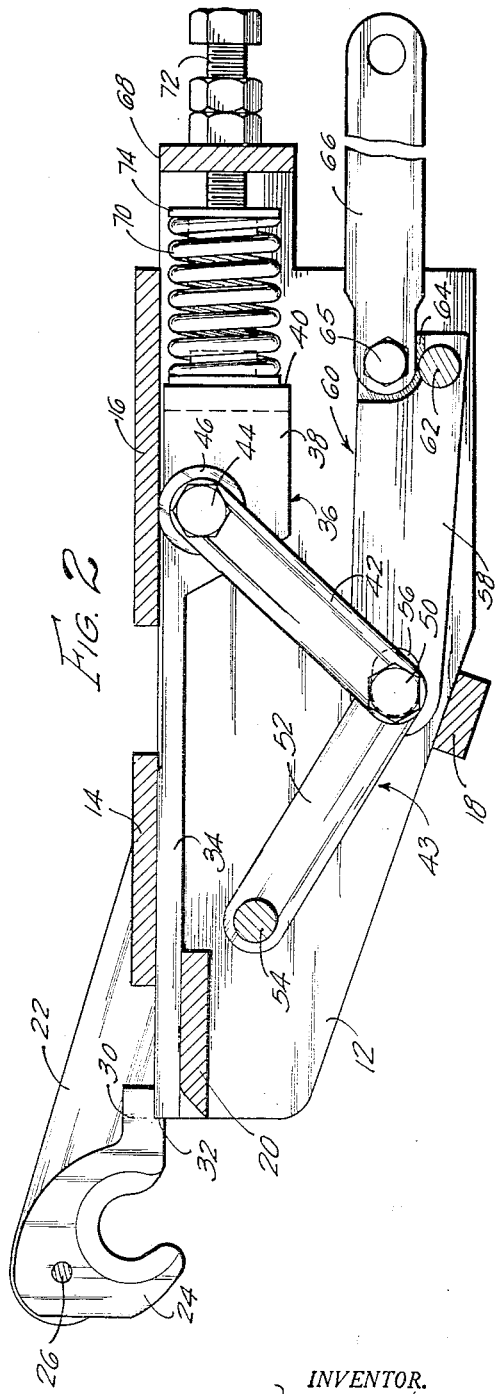
INVENTOR.
DONALD W. HAMBLIN
BY
ATTORNEYS Dec. 20, 1955  D. W. HAMBLIN  2,727,291
AIRCRAFT CATAPULT HOLDBACK AND RELEASE UNIT
Filed April 28, 1953  2 Sheets-Sheet 2
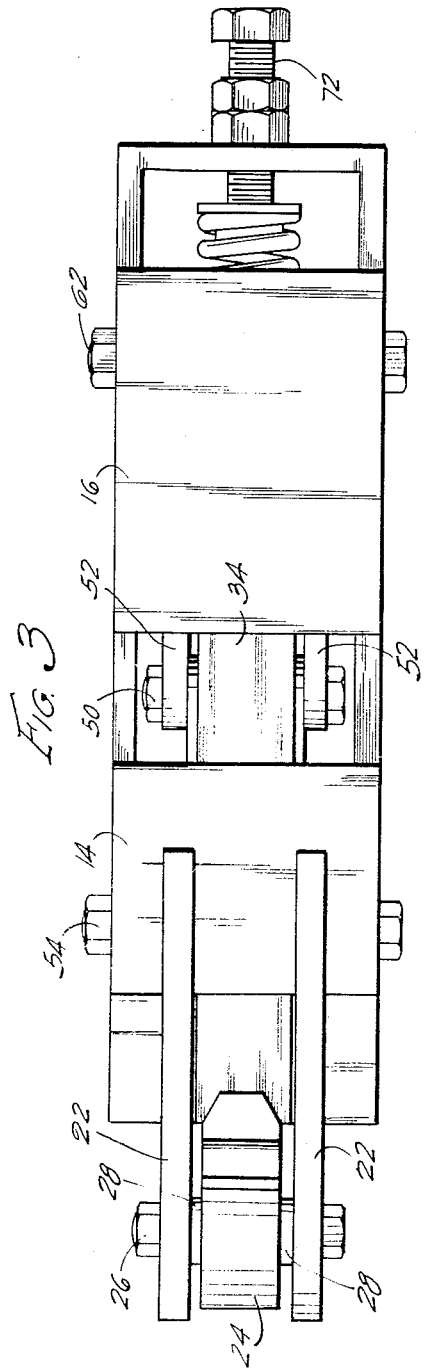
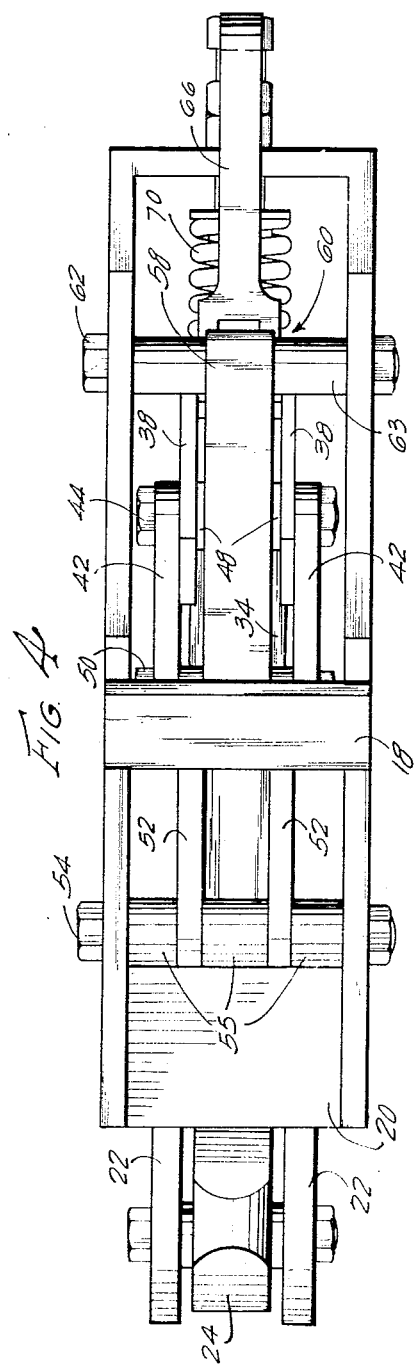
INVENTOR.
DONALD W. HAMBLIN
BY

United States Patent Office 2,727,291
Patented Dec. 20, 1955

2,727,291

AIRCRAFT CATAPULT HOLDBACK AND RELEASE UNIT

Donald Wayne Hamblin, Philadelphia, Pa.

Application April 28, 1953, Serial No. 351,768

5 Claims. (Cl. 24—230.5)

(Granted under Title 35, U. S. Code (1952), sec. 266)

The invention described herein may be manufactured by or for the Government of the United States of America for governmental purposes without the payment of any royalties thereon or therefor.

This invention relates to a holdback and release device for use with aircraft catapults, this device being for the purpose of holding an aircraft in a ready position on the catapult until a launching force is applied, at which time the holdback and release unit automatically acts to release the aircraft.

Heretofore, the holdback and release device generally used comprised a frangible tension ring which was of sufficient strength to hold the aircraft in its ready position until the launching force was applied, at which time the ring was broken by the launching force on the aircraft and the aircraft was released. After being broken, these tension rings tended to fly away in all directions and constituted a great hazard both to personnel and aircraft. Furthermore, the cost of manufacturing these tension rings was exceedingly great, and since it is estimated that approximately 100,000 to 150,000 of these rings have been normally used by the Navy alone each year, the consequent cost to the Government has been a matter to be reckoned with.

This present invention, by entirely eliminating the use of tension rings and substituting therefor a permanent device which can be used repeatedly and which presents no danger from flying particles, has solved a long standing problem.

It is, therefore, one object of this invention to provide a holdback and release mechanism for catapults which is unbreakable and which can be used repeatedly.

Another object of this invention is to provide a holdback and release mechanism which is of simple but sturdy construction and which is easy to operate.

Another object of this invention is to provide a holdback and release mechanism which requires no expensive replaceable parts.

Other objects and many of the attendant advantages of this invention will be readily appreciated as the same becomes better understood by reference to the following detailed description when considered in connection with the accompanying drawings wherein:

Fig. 1 is a side elevational view of an embodiment of the invention.

Fig. 2 is a view similar to Fig. 1 but taken in cross-section thereof.

Fig. 3 is a top plan view of the device.

Fig. 4 is a bottom plan view of the device.

Referring now in greater detail to the drawings wherein similar reference characters refer to similar parts, there is shown a main housing 10 consisting of a pair of parallel side walls 12 and being open at the top and bottom except for a pair of longitudinally spaced plates 14 and 16 at the top and a cross-bar 18 at the bottom. A plate 20 extends between the walls 12 of the housing at the front portion thereof, this plate being situated parallel to but spaced below and off-set from the plate 14.

Attached to the plate 14 are a pair of forwardly extending, inclined arms 22 to the forward ends of which there is attached a hook 24 pivotally mounted on a bolt 26 between a pair of spacers 28. The hook is provided with a rear flange 30 on the underside of which is formed a shoulder 32 against which there is adapted to seat the front end of a latch bar 34.

The latch bar 34, the front portion of which is adapted to be supported by plate 20, is integral with a housing 36 consisting of a pair of parallel side plates 38 and a back plate 40. A pair of toggle arms 42 forming part of a toggle mechanism 43 are pivotally connected to the outside of the housing 36 by a bolt 44. Also mounted on the bolt 44 for rotation is a roller 46 set between a pair of spacers 48 within the housing 36. The roller 46 has a periphery which extends beyond the open top of the housing 36 and the roller is, thereby, adapted to roll along the underside of the plate 16.

The opposite ends of the toggle arms 42 are pivotally supported by a bolt 50 which also pivotally supports one end of the arms 52 which form the other part of the toggle mechanism 43. The opposite ends of the arms 52 are pivotally connected to the main housing 10 by the bolt 54 upon which are provided spacers 55. The bolt 50 is supported within a slot 56 of the long arm 58 of a bell crank 60 which is pivotally connected to the main housing 10 by a bolt 62 upon which are provided spacers 63. The short arm of the bell crank is formed at 64 in the area between the bolt 62 and a bolt 65 which pivotally connects the bell crank to a link 66. The link 66 is for the purpose of connecting the bell crank to the standard coupling means used on an aircraft carrier's flight deck or the like for anchoring the holdback and release mechanism to the deck.

A spring housing 68, at the rear of the main housing 10, encloses a spiral spring 70 which acts to bias the housing 36 and latch bar 34 forwardly. The tension of spring 70 is adjustable by means of bolt 72 which engages complementary internal threads of the aperture in spring housing 68 and spring follower 74. A nut and lock nut of the conventional type are provided to hold the bolt and thereby the spring in adjusted positions.

In operation, when an aircraft is attached to the hook 24 before launching, the spring 70 biases the housing 36 and latch bar 34 into the latching position illustrated in Fig. 2, and the hook remains attached to the aircraft. When a launching force is applied to the aircraft, however, the force, exerted through the aircraft on the hook, causes the main housing 10 and its associated parts to rotate counterclockwise slightly about pivot point 65. This rotary movement of housing 10 causes arm 58 of bell crank 60 to rotate clockwise about pivot point 62 thereby straightening out the toggle mechanism 43 and driving housing 36 and latch bar 34 back against compression spring 70. This allows the flange 30 of the hook to clear the latch bar and the hook to pivot on its bolt 26, releasing the aircraft. After release of the aircraft, the biasing action of the spring acts to bring the latch bar mechanism back to its normal position and the hook is manually turned over so that the flange 30 again rests on the upper surface of the latch bar 34, as illustrated in Figs. 1 and 2 wherein it is ready for its next operation as a holdback and release device. The slot 56 is provided in the arm 60 to permit some play in the reset operation, when the spring forces the latch forward, in order that severe forces will not be suddenly applied to the bolt 50. It is to be noted that the bar 18 is provided primarily as a stop for the toggle in its lowermost position. The roller 46, by being adapted to freely reciprocate relative to the main housing 10, provides for a substantially frictionless relative movement between the latch mechanism and the main housing.

Obviously many modifications and variations of the present invention are possible in the light of the above teachings. It is, therefore, to be understood that within the scope of the appended claims, the invention may be practiced otherwise than as specifically described.

What is claimed as the invention is:

1. A holdback and release mechanism for use with catapults comprising a housing, a hook mounted for rotation at one end of said housing, a flange on said hook, a shoulder on said flange, a latch means slidably positioned on said housing, one end of said latch means being adapted to engage said shoulder, to hold said hook in a predetermined position, a spring in said housing, said spring bearing on the opposite end of said latch means to bias said latch means toward said hook, toggle linkage connecting said latch means to said housing, and means to move said toggle linkage connected thereto.

2. A holdback and release mechanism for use with catapults comprising a housing, a hook support at one end of said housing, a hook rotatably mounted on said hook support, a spring-pressed latch bar slidably mounted in said housing for movement toward and away from said hook, said spring acting to bias said latch bar toward said hook, means on said hook and on said latch bar for holding said hook in a predetermined position, a toggle mechanism connecting said latch bar to said housing, a bell crank connected to said toggle mechanism, and means connected to said bell crank for anchoring said holdback and release mechanism to a relative stationary platform.

3. A holdback and release mechanism for use with catapults comprising a primary housing, a hook rotatably mounted on said primary housing, a latch bar slidable relative to said primary housing, said latch bar being adapted to hold said hook in a predetermined position, a secondary housing connected to said latch bar, a toggle mechanism comprising a pair of arms, one end of each of which is pivotally connected to said primary housing and the opposite end of each of which is pivotally connected to a shaft movable relative to said primary housing, and a second pair of arms, one end of each of which is pivotally connected to said shaft and the opposite end of each of which is pivotally connected to a second shaft movable relative to said primary housing, said second shaft being connected to and extending through said secondary housing, a roller mounted on said second shaft within said secondary housing, said roller having a periphery extending beyond an open end of said secondary housing whereby said roller is adapted to reciprocate over a plate fixed to said primary housing, and means to actuate said toggle mechanism so as to reciprocate said roller.

4. The device of claim 3 wherein means are provided on said primary housing for biasing said secondary housing and its attached latch bar toward said hook.

5. The device of claim 4 wherein said biasing means are adjustable.

References Cited in the file of this patent

UNITED STATES PATENTS

| | | |
|---|---|---|
| 37,681 | De Garno | Feb. 17, 1863 |
| 1,242,809 | Irwin | Oct. 9, 1917 |
| 1,375,605 | Pepper | Apr. 19, 1921 |
| 1,557,141 | Conner | Oct. 13, 1925 |
| 1,859,488 | Apman | May 24, 1932 |
| 1,963,634 | Stahl | June 19, 1934 |
| 2,410,816 | Frieder | Nov. 12, 1946 |
| 2,413,392 | Veverka | Dec. 31, 1946 |
| 2,486,418 | Jolly | Nov. 1, 1949 |

FOREIGN PATENTS

| | | |
|---|---|---|
| 325,690 | Germany | of 1920 |